United States Patent
Thielo

(10) Patent No.: US 10,372,186 B2
(45) Date of Patent: Aug. 6, 2019

(54) CONTROL DEVICE AND COMPUTER-READABLE RECORDING MEDIUM HAVING STORED THEREIN CONTROL PROGRAM

(71) Applicant: FUJITSU LIMITED, Kawasaki-shi, Kanagawa (JP)

(72) Inventor: Omar Hame Thielo, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 142 days.

(21) Appl. No.: 15/264,652

(22) Filed: Sep. 14, 2016

(65) Prior Publication Data

US 2017/0090543 A1  Mar. 30, 2017

(30) Foreign Application Priority Data

Sep. 24, 2015  (JP) ................................ 2015-186688

(51) Int. Cl.
| | |
|---|---|
| *G06F 9/00* | (2006.01) |
| *G06F 1/3206* | (2019.01) |
| *G06F 13/40* | (2006.01) |
| *G06F 1/3234* | (2019.01) |

(52) U.S. Cl.
CPC .......... *G06F 1/3206* (2013.01); *G06F 1/3234* (2013.01); *G06F 13/4068* (2013.01); *Y02D 10/14* (2018.01); *Y02D 10/151* (2018.01)

(58) Field of Classification Search
CPC ... G06F 1/3206; G06F 13/4068; Y02D 10/14; Y02D 10/151
USPC .......................... 713/300, 323, 320; 710/104
See application file for complete search history.

(56) References Cited

U.S. PATENT DOCUMENTS

| | | | |
|---|---|---|---|
| 8,601,296 B2 * | 12/2013 | Jeyaseelan | G06F 1/3203 713/320 |
| 8,990,464 B2 * | 3/2015 | Kessler | G06F 13/4295 710/104 |
| 9,098,304 B2 * | 8/2015 | Young | G06F 9/4415 |
| 9,229,836 B2 * | 1/2016 | Saunders | G06F 11/3051 |
| 9,507,398 B2 * | 11/2016 | Lim | G06F 1/266 |
| 9,594,424 B2 * | 3/2017 | Hanayama | G06F 13/4068 |
| 9,672,183 B2 * | 6/2017 | Kakish | G06F 13/10 |
| 9,697,168 B2 * | 7/2017 | Ranganathan | G06F 13/4291 |
| 9,734,108 B2 * | 8/2017 | Shahoian | G06F 13/4068 |

(Continued)

FOREIGN PATENT DOCUMENTS

| | | |
|---|---|---|
| JP | 2002-118563 | 4/2002 |
| JP | 2002-163049 | 6/2002 |

*Primary Examiner* — Aurel Prifti
(74) *Attorney, Agent, or Firm* — Fujitsu Patent Center

(57) ABSTRACT

A control device includes a controller that controls a target device, and the controller includes a power supply controller, a detector, an obtainer, and a setting changer. The power supply controller shifts, when a port connected to another device via a cable comes into an unused state, a power supply mode to the target device and to the control device from a normal power supply mode into a power saving mode capable of receiving activation interruption. The obtainer obtains, when the detector detects the change in the mounting state of the cable, type information representing a type of the cable. The setting changer that changes setting of the cable in accordance with the type information obtained by the obtainer. This makes it possible to be surely restored to the normal power supply mode even when a cable is replaced with another type of cable in a power saving mode.

18 Claims, 10 Drawing Sheets

(56) References Cited

U.S. PATENT DOCUMENTS

| | | | | |
|---|---|---|---|---|
| 9,842,076 B2* | 12/2017 | Ghosh | ................. | G06F 13/4022 |
| 9,880,601 B2* | 1/2018 | Gough | ..................... | G06F 1/28 |
| 10,001,799 B2* | 6/2018 | Leinonen | .................. | G05F 3/02 |
| 10,216,255 B2* | 2/2019 | Yseboodt | ................. | G06F 1/266 |
| 2002/0046355 A1 | 4/2002 | Takeuchi | | |
| 2006/0244462 A1* | 11/2006 | McCosh | ................. | H04B 3/46 |
| | | | | 324/522 |
| 2007/0220280 A1* | 9/2007 | Karam | ................... | H04L 12/10 |
| | | | | 713/300 |
| 2009/0244282 A1* | 10/2009 | Eguiguren | ............ | H04N 7/183 |
| | | | | 348/148 |
| 2014/0281616 A1* | 9/2014 | Moran | ................. | G06F 1/3243 |
| | | | | 713/323 |
| 2015/0082064 A1* | 3/2015 | Sinha | ............... | H04W 52/0251 |
| | | | | 713/323 |
| 2015/0323968 A1* | 11/2015 | Chong | ................... | H04L 12/10 |
| | | | | 713/310 |
| 2015/0331463 A1* | 11/2015 | Obie | .................... | G06F 1/1632 |
| | | | | 713/300 |
| 2017/0244787 A1* | 8/2017 | Rangasamy | ........ | H04L 67/1095 |

\* cited by examiner

FIG. 3

| SAS CABLE TYPE | Vact | Ptt |
|---|---|---|
| COPPER CABLE | OFF | ON |
| AOC CABLE | ON | OFF |

CONTROL DEVICE AND COMPUTER-READABLE RECORDING MEDIUM HAVING STORED THEREIN CONTROL PROGRAM

CROSS-REFERENCE TO RELATED APPLICATION

This application is based upon and claims the benefit of priority of the prior Japanese Application No. 2015-186688 filed on Sep. 24, 2015 in Japan, the entire contents of which are hereby incorporated by reference.

FIELD

The embodiments herein relate to a controller device and a computer-readable recording medium having stored therein a control program.

BACKGROUND

Some storage devices each have a large storage capacity provided by connecting multiple memory devices to one another via, for example, expander modules. An example of an expander module is an SAS expander, and examples of the memory device are an HDD and an SSD. Hereinafter, a memory device is sometimes referred to as a disk.

The term "SAS" is an abbreviation for Serial Attached SCSI; the term SCSI is an abbreviation for Small Computer System Interface. The term "HDD" is an abbreviation for a Hard Disk Drive, and the term "SSD" is an abbreviation for Solid State Drive.

Such a storage device includes a Drive Enclosure (DE) that includes multiple disks and an SAS expander, and a controller module (CM) that controls the DE. The multiple disks in the DE are connected to the CM via the SAS expander.

The SAS expander is provided with multiple SAS ports (PHYs). The multiple SAS ports include an upper connection port connected to the CM or an SAS port of an upper DE and a lower connection port connected to the upper connection port of a lower DE. Two SAS ports are connected to each other through an SAS cable.

[Patent Literature 1] Japanese Laid-open Patent Publication No. 2002-118563

[Patent Literature 2] Japanese Laid-open Patent Publication No. 2002-163049

Some recent SAS expanders (expander chips) are provided with a function of Wake on SAS. An SAS expander with the function of Wake on SAS automatically turns on and off the power source for the DE in synchronization with a link-up state of the upper connection port. For this purpose, the firmware of the SAS expander monitors, for example, the link-up state of the upper connection port. Upon detection of continuing a link-down state of all the upper connection ports for a predetermined time period (e.g., two seconds), the firmware switches the power supply to the disks and the expander chip in the DE to a consumption-power saving mode (Low Power), so that the power supply to the DE can be made into a state of being close to zero.

After being switched into the consumption-power saving mode by the above function of Wake on SAS, the SAS expander keeps only the activation interruption receiver that receives, as activation interruption, an SAS packet (Out Of Band: OOB) for restoring the power supply state to a normal power supply mode to a resident state (i.e., in a state of turning on the power supply). Then, the SAS expander turns off the power supply to the parts and elements in the DE except for the activation interruption receiver. Examples of the parts and elements in the DE except for the activation interruption receiver correspond to the multiple disks and the elements and parts in the SAS expander except for the activation interruption receiver.

The activation interruption receiver interrupts the SAS expander upon receipt and detection of an SAS packet (OOB) in the consumption-power saving mode. In response to the interruption, the firmware of the SAS expander switches the power supply state thereof from the consumption-power saving mode into a normal power supply mode, and thereby activates (Wakes up) all the disks and the entire SAS expander in the DE.

A typical SAS cable that connects SAS ports is made of Copper (hereinafter, such a cable is referred to as a Copper cable) while also an Active Optical Cable (AOC cable) has been recently used as a SAS cable. For the above, an SAS expander (expander chip) has dealt with an AOC cable as well as a Copper cable.

The specification of a Copper cable is different from that of an AOC cable. For the above, the firmware of an SAS expander specifies the type of the SAS cable (here whether the SAS cable is a Copper cable or an AOC cable), and changes the setting of an SAS port on the expander chip in accordance with the type of an SAS cable. Unless a correct setting in accordance with the type of an SAS cable is set for the SAS port, the SAS expander does not successfully receive an SAS packet for activation interruption and consequently does not restore the power supply state from the consumption-power saving mode to the normal power supply mode.

For example, when an SAS cable has been hot-swapped from a Copper cable to an AOC cable, the monitoring function of the firmware of the SAS expander detects a change in the mounting state of the SAS cable (unplugging and plugging of a cable). Detection of a change in the mounting state of the SAS cable causes the firmware to specify the type of the replacement SAS cable and changes the setting of the SAS cable in accordance with the specified type.

In contrast, when an SAS cable has been cold-swapped from a Copper cable to an AOC cable after the SAS expander is switched into the consumption-power saving mode by the above function of Wake on SAS, the functional elements of the SAS expander except for the activation interruption receiver are in the off state. Under this state, the SAS expander is not allowed to change the setting of the SAS cable. Furthermore, the SAS expander is incapable of receiving an SAS packet (OOB) as activation interruption even if the activation interruption receiver is in the resident state, so that the SAS expander would be fallen into a dead-lock state where the above function of Wake on SAS is incapable of activating the DE.

SUMMARY

According to an aspect of the embodiments, a control device includes a controller that controls a target device, and the controller includes a power supply controller, a detector, an obtainer, and a setting changer. The power supply controller shifts, when a port connected to another device via a cable comes into an unused state, a power supply state to the target device and to the control device from a normal power supply mode into a power saving mode capable of receiving activation interruption. The detector detects a change in a mounting state of the cable in the power-saving mode. The obtainer obtains, when the detector detects the change in the mounting state of the cable, type information representing a type of the cable. The setting changer changes setting of the cable in accordance with the type information obtained by the obtainer.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF THE DRAWINGS

FIG. 3 is a diagram illustrating an example of setting (setting information table) for each type of SAS cable;

DESCRIPTION OF THE PREFERRED EMBODIMENTS

Hereinafter, description will now be made in relation to a control device and a computer-readable recording medium having stored therein a control program disclosed herein with reference to the drawings. The following embodiments are exemplary, so there is no intention to exclude application of various modifications and techniques not suggested in the following description to the embodiments. Namely, various changes and modifications to the embodiments can be suggested without departing from the spirit of the present invention. The accompanying drawings do not intend to include only the elements appearing therein, but may include additional elements and functions. The embodiments can be combined as far as not incurring a contradiction in the process.

Figure 1:
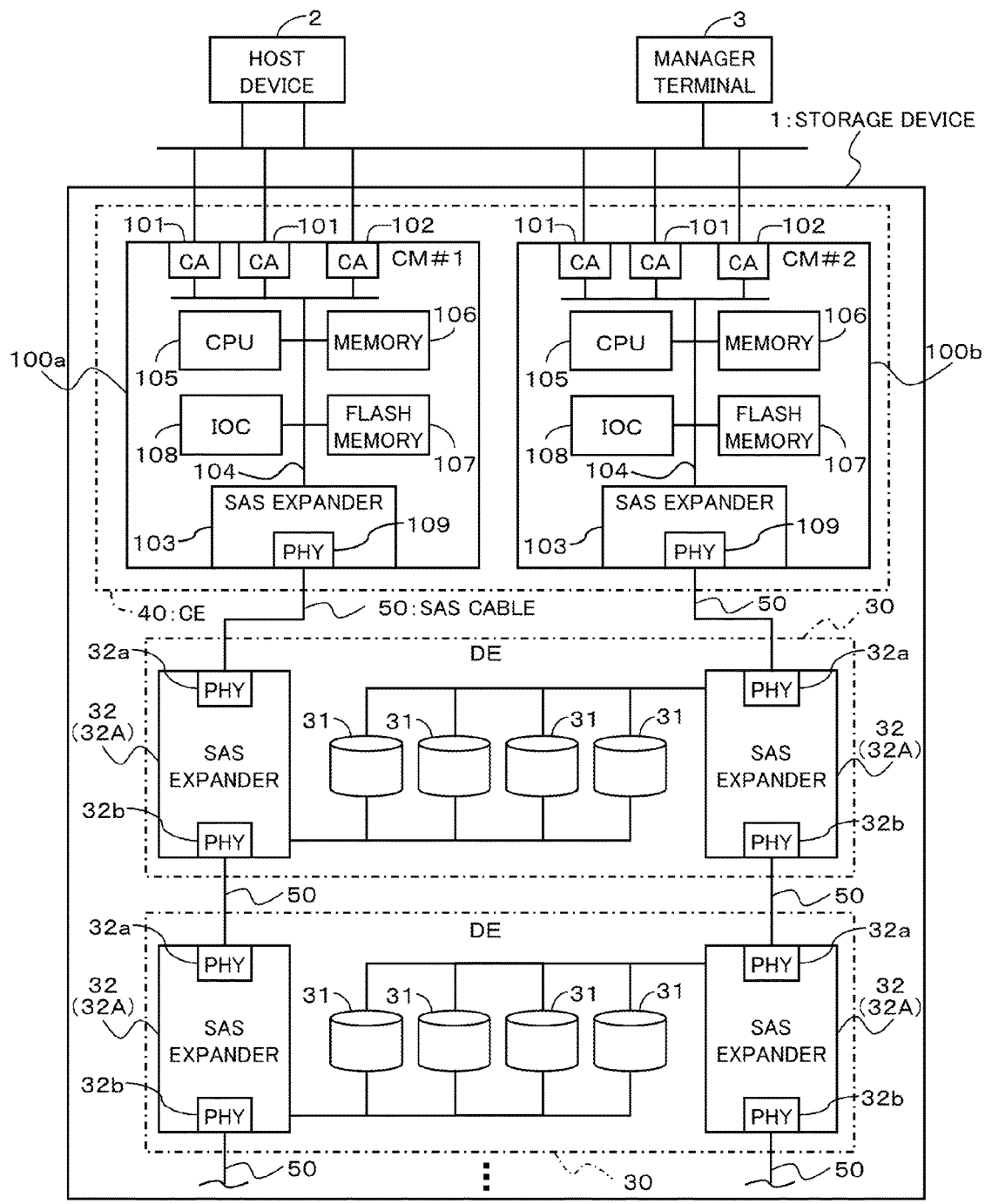
FIG. 1 is a block diagram schematically illustrating an example of the hardware configuration of a storage device including a control device (SAS expander) according to a first or a second embodiment of the present invention.

(1) Hardware Configuration of a Storage Device to which the Present Invention is to be Applied First, description will now be made in relation to a storage device 1 including an SAS expander (control device) 32 or 32A according to a first or a second embodiment of the present invention by referring to FIG. 1. Here, FIG. 1 is a block diagram schematically illustrating an example of the hardware configuration of a storage device 1 including a control device (SAS expander) 32 or 32A according to the first or second embodiment of the present invention.

The storage device 1 forms virtual storage environment by, for example, virtualizing memory devices 31 stored in a drive enclosure (DE) 30, and provides a virtual volume to a host device 2.

The storage device 1 is communicably connected to one or more (one in the example of FIG. 1) host devices 2. Each host device 2 is connected to the storage device 1 via Communication Adaptors (CAs) 101 and 102 that are to be described below.

The host device 2 is an information processor having a server function, and transmits and receives commands of Network Attached Storage (NAS) and Storage Area Network (SAN) to and from the storage device 1. For example, the host device 2 writes and reads data into and from a volume that the storage device 1 provides by transmitting an NAS storage access command for reading/writing to storage device 1.

In response to an input-output request (e.g., a reading command or writing command) that the host device 2 made for the volume, the storage device 1 reads and writes data from and into a memory device 31 corresponding to the requested volume. Hereinafter, an input-output request from the host device 2 is sometimes referred to as an IO request and an IO command.

One host device 2 appears in the example of FIG. 1. However, the number of host device 2 is not limited to one. Alternatively, two or more host devices 2 may be connected to a single storage device 1.

A manager terminal 3 is communicably connected to the storage device 1. The manager terminal 3 is an information processor equipped with an input device such as a keyboard and/or a mouse and a display monitor, and the user such as a system manager inputs various pieces of information into the manager terminal 3. For example, the user inputs information related to various settings via the manager terminal 3. The information input into the manager terminal 3 is transmitted to the host device 2 or the storage device 1.

As illustrated in FIG. 1, the storage device 1 includes multiple (two in this embodiment) CMs 100a and 100b and multiple stages (two stages in the example of FIG. 1) of DEs 30. The CMs 100a and 100b are mounted on a Controller Enclosure (CE) 40.

Each DE 30 is accommodatable of one or more (four in the example of FIG. 1) memory devices 31 and provides the storage regions (real volume, real storage) of the memory devices 31 to the storage device 1.

For example, each DE 30 includes multiple stage of slots (not illustrated) and is capable of occasionally varying a real volume capacity by placing the memory devices 31 into these slots. In addition, the DE 30 is capable of configure Redundant Arrays of Inexpensive Disks (RAID) by using multiple memory devices 31. Examples of a memory device 31 are a HDD and an SSD that stores therein various pieces of data. Hereinafter, a memory device 31 may sometimes be referred to as a disk.

Each DE 30 includes a pair of SAS expanders 32, 32 (32A, 32A). Each SAS expander 32 (32A) has a function of controlling a disk 31, which is a control target device of the DE 30. Each SAS expander 32 (32A) includes an upper connection port (SAS port, PHY) 32a and a lower connection port (SAS port, PHY) 32b, so that an added DE 30 (disk 31) can be connected to the DE 30.

Hereinafter, the upper connection port may also be referred to as an SAS input port and an upstream port while the lower connection port may also be referred to as an SAS output port and a downstream port. The SAS expander 32 corresponds to a control device of the first embodiment that is to be detailed below with reference to FIG. 2, and the SAS expander 32A corresponds to a control device of the second embodiment that is to be detailed below with reference to FIG. 7.

A first-stage (upper side in FIG. 1) DE 30 is connected to the CMs 100a and 100b included in the CM 40. More specifically, the upper connection port 32a of one of the SAS expanders 32 (32A) in the first-stage DE 30 is connected to an SAS port 109 (to be detailed below) of an SAS expander 103 of the CM 100a via an SAS cable 50. Likewise, the upper connection port 32a of the other of the SAS expanders 32 (32A) in the first-stage DE 30 is connected to an SAS port 109 (to be detailed below) of an SAS expander 103 of the CM 100b via an SAS cable 50.

The DE 30 on the second stage (lower side of FIG. 1) is connected to the lower end of the first-state DE 30. More specifically, the lower connection port 32b of one of the SAS expanders 32 (32A) in the first-stage DE 30 is connected to the upper connection port 32a of one of the SAS expanders 32 (32A) of the second-stage DE 30 via an SAS cable 50. Likewise, the lower connection port 32b of the other of the SAS expanders 32 (32A) in the first-stage DE 30 is connected to the upper connection port 32a of the other of the SAS expanders 32 (32A) of the second-stage DE 30 via an SAS cable 50.

Likewise the connection between the first-stage DE 30 and the second-stage DE 30, the third- and subsequent-stage DEs 30 can be successively connected to the lower end of the second-stage DE 30 via SAS cables 50.

As described above, multiple stages of DEs 30 are connected to the lower end (the SAS ports 109 of the SAS expanders 103 of CMs 100a and 100b) via SAS cables 50. This structure allows both the CMs 100a and 100b to access each DE 30 for data reading and writing. Namely, each disk 31 in each DE 30 is connected to both the CMs 100a and 100b, which means an access paths to the disk 31 is made redundant.

The CMs 100a and 100b are controllers (storage control devices) each of which controls the operation in the storage device 1 and specifically control various operations, such as data access to a disk 31 of a DE 30 in obedience to an IO command transmitted from the host device 2. The CMs 100a and 100b are the same in configuration. Hereinafter, a particular one of the CMs is specified by a reference number 100a and 100b, but an arbitrary CM is represented by a reference number 100. In addition, the CM 100a and the CM 100b are sometimes referred to as CM#1 and CM#2, respectively.

The CMs 100a and 100b form a redundant system, and under a normal state, the CM 100a (CM#1) functions as a primary module in charge of various controls. In case where the primary CM 100a fails, the secondary CM 100b (CM#2) functions as the primary device and takes over the operation of the CM 100a.

The CMs 100a and 100b are connected to the host device 2 via CAs 101 and 102. The CMs 100a and 100b receive an IO command such as a reading/writing command from the host device 2 and control a disk 31 via the SAS expanders 103 and 32 (32A) in obedience to the IO command. Furthermore, the CMs 100a and 100b are communicably connected to each other via a non-illustrated interface conforming to, for example, the Peripheral Component Interconnect express (PCIe).

As illustrated in FIG. 1, a CM 100 includes a Central Processing Unit (CPU) 105, a memory 106, a flash memory 107, and an Input Output Controller (IOC) 108 in addition to the CAs 101 and 102 and the SAS expander 103. The CAs 101 and 102, the SAS expander 103, the CPU 105, the memory 106, the flash memory 107, and the IOC 108 are communicably connected to one another via, for example, a PCIe interface 104.

The CAs 101 and 102 receive data transmitted from the host device 2 and the manager terminal 3, and transmit data output from the CM 100 to the host device 2 and the manager terminal 3. This means that the CAs 101 and 102 control data Input-Output (IO) into and from an external device such as the host device 2.

The CA 101 is a network adaptor that communicably connects the local CM 100 to the host device 2 and the manager terminal 3 via the NAS, and is exemplified by a Local Area Network (LAN) interface. Each CM 100 is connected to, for example, the host device 2 at the CA 101 via a non-illustrated communication line by means of the NAS, and, with this configuration, receives an IO command and receives and transmits data. In the example of FIG. 1, each of CMs 100a and 100b includes two CAs 101, 101.

The CA 102 is a network adaptor that communicably connects the local CM 100 to the host device 2 via the SAN, and is exemplified by an Internet Small Computer System Interface (iSCSI) interface and a Fibre Channel (FC) interface. Each CM 100 is connected to, for example, the host device 2 at the CA 102 through a non-illustrated communication line by means of the SAN, and with this configuration, receives an IO command and transmits and receives data. In the example of FIG. 1, one CA 102 is provided to each of the CMs 100a and 100b.

The SAS expander 103 is an interface that communicably connects the local CM 100 to the disks 31 and the SAS expander 32 (32A) in a DE 30, and includes one or more SAS ports (PHYs) 109. As described above, to the SAS port 109, the SAS expander 32 (32A) in the first-stage DE 30 is connected via the SAS cable 50. With this configuration, each CM 100 controls an access to a disk 31 on the basis of an IO command received from the host device 2 through the SAS expander 103, the SAS cable 50, and SAS expander 32 (32A). This means that both CM 100a and 100b write and read data into and from a disk 31 of a DE 30.

The flash memory 107 is a memory device that stores therein a program to be executed by the CPU 105 and various pieces of data.

The memory 106 is a memory device that temporarily stores therein various pieces of data and a program, and is provided with, for example, a cache region and an application region. The cache region temporarily stores therein data received from the host device 2 and data to be transmitted to the host device 2. The application region temporarily stores therein data and an application program when the CPU 105 is to execute the application program. The application program is, for example, a program that the CPU 105 executes to achieve the function of storage control of this embodiments. The application program is stored in the memory 106 or the flash memory 107.

The IOC 108 is a control device that controls data forwarding in the local CM 100, and achieves, for example, Direct Memory Access (DMA) forwarding capable of forwarding data stored in the memory 106 without the aid of the CPU 105.

The CPU 105 is a processor that carries out various controls and calculations and is exemplified by a multicore processor (multi-CPU). The CPU 105 achieves various functions by executing the Operating system (OS) and an application program that are stored in the memory 106 and the flash memory 107.

(2) Overview of a Control Device (SAS Expander) of the Present Invention

As described above, some recent SAS expanders (expander chips) are provided with the function of Wake on SAS. In the first and second embodiments to be described below, the SAS expanders 32 (32A) included in the DEs 30 are assumed to have the function of Wake on SAS while the SAS expander 103 of each CM 100 in the CE 40 is assumed not to be provided with the function of Wake on SAS.

The SAS expanders 32 (32A) having the function of Wake on SAS automatically turn on and off the power source for the DE 30 in synchronization with a link-up state of the upper connection ports 32a. At this time, the firmware (CPU 320 (320A) to be described below, see FIGS. 2 and 7) of the SAS expanders 32 (32A) monitors the link-up state of the upper connection ports 32a. In the event of detecting continuation of a link-down state of all the upper connection ports 32a for a predetermined time period (e.g., two seconds) in the above monitoring, the firmware determines all the upper connection ports 32a is in an unused state. In accordance with the result of the determination, the firmware switches the power supply state to each disk 31 in the DE 30 and SAS expanders 32 (32A) into a consumption-power saving mode (sleep state). This makes the power supply to the DE 30 into a state of being almost zero.

In the consumption-power saving mode, the SAS expanders 32 (32A) keeps at least an activation interruption receiver 325 (see FIGS. 2 and 7) that receives an SAS packet (OOB) as an activation interruption to be in a resident state (i.e., power-supplying on state). Here, an SAS packet (OOB) is a packet to restore the power supply state from the consumption-power saving mode to the normal power supply mode.

Upon receipt and detection of an SAS packet (OOB) in the consumption-power saving mode, the activation interruption receiver 325 interrupts the firmware of the SAS expanders 32 (32A). In response to the interruption, the firmware of the SAS expanders 32 (32A) switches the power supply state from the consumption-power saving mode to the normal power supply mode, and wakes up all the disks 31 in the DE 30 and the entire of the SAS expanders 32 (32A).

The SAS cables 50 that connect the SAS port 109 to the SAS port 32a and connect the SAS port 32a to the SAS port 32b may be Copper cables and AOC cables. For the above, the SAS expanders 32 (32A) of the DE 30 of the first and second embodiments to be detailed below are configured to deal with both a Copper cable and an AOC cable.

The specification of a Copper cable is different from that of an AOC cable. For the above, the firmware of the SAS expanders 32 (32A) specifies the type of the SAS cable 50 (here whether the SAS cable is a Copper cable or an AOC cable), and changes the setting of an SAS port 32a in accordance with the type of an SAS cable 50. The detailed contents of the setting will be described below with reference to FIG. 3.

Unless a correct setting in accordance with the type of an SAS cable 50 is set for the SAS port 32a, the SAS expanders 32 (32A) do not successfully receive an SAS packet (OOB) for activation interruption, and consequently do not restore the power supply state from the consumption-power saving mode to the normal power supply mode.

As described above, when an SAS cable 50 has been hot-swapped from a different type of cable, the firmware of the SAS expanders 32 (32A) detects a change in the mounting state of the SAS cable 50 (unplugging and plugging of the cable 50). Detection of a change in the mounting state of the SAS cable 50 causes the firmware to specify the type of the replacement SAS cable 50 and changes the setting of the SAS cable in accordance with the specified type.

In contrast, when an SAS cable 50 has been cold-swapped from a different type of cable after the power supply state is shifted into the consumption-power saving mode by the above the function of Wake on SAS, the type of the replacement SAS cable 50 is not reflected in the setting. Namely, the setting conforming to the type of the SAS cable 50 is not correctly made, the activation interruption receiver 325, even in the resident state, fails to receive an SAS packet (OOB) as activation interruption. Accordingly, the SAS expanders 32, 32A would sometimes be fallen into a deadlock state where the above function of Wake on SAS is incapable of activating the DE 30.

For the above, the control device (SAS expander 32 or 32A) of the present invention is configured to be capable of being surely restored to a normal power supply mode even when the SAS cable 50 is replaced with a different type of an SAS cable in the consumption-power saving mode (sleep state). In other words, the SAS expander 32 or 32A is configured as follows such that the function of Wake on SAS correctly operates even when the SAS cable 50 is replaced with a different type of an SAS cable in the consumption-power saving mode (sleep state).

The SAS expander 32 or 32A includes a controller (firmware) 320 or 320A (see FIGS. 2 and 7) that control the disks (target device) 31 in the DE 30. The controller 320 or 320A includes at least a power supply controller 321 or 321A, a detector 322 or 322A, an obtainer 323, and a setting changer 324 (see FIGS. 2 and 7).

The power supply controller 321 or 321A shifts the power supply state to the disks 31 and the SAS expander 32 or 32A from the normal power supply mode to the consumption-power saving mode, during which activation interruption can be received, when the upper connection port 32a connected to another devices 100 and 30 via the SAS cable 50 comes into an unused state. The detector 322 or 322A detects a change in the mounting state of the SAS cable 50 in the consumption-power saving mode. When the detector 322 or 322A detects a change in the mounting state of the SAS cable 50, the obtainer 323 obtains the type information representing the type of the SAS cable. The setting changer 324 changes the setting of the SAS cable 50 in the controller 320 or 320A in accordance with the type information obtained by the obtainer 323. For example, when an SAS packet (OOB) is received as activation interruption in the consumption-power saving mode, the power supply controllers 321 and 321A are activated and shift the power supply state from the consumption-power saving mode to the normal power supply mode.

This configuration allows the control device (SAS expander) 32 or 32A of the present invention to surely restore the power supply state to a normal power supply mode when the SAS cable 50 is replaced with a different type of the SAS cable 50 in the consumption-power saving mode (sleep state). This means that the SAS expanders 32, 32A can receive an SAS packet (OOB) as activation interruption even when the SAS cable 50 is cold-swapped with a different type of the SAS cable 50 in the consumption-power saving mode, so that the above deadlock state can be cancelled and the function of Wake on SAS efficiently operates. Accordingly, the SAS expander 32 or 32A effectively use the function of Wake on SAS, so that the power to drive the DE 30 can be saved.

(3) First Embodiment

Next, description will now be made with reference to the control device (SAS expander) 32 of the first embodiment by referring to FIGS. 2-5.

Figure 2:
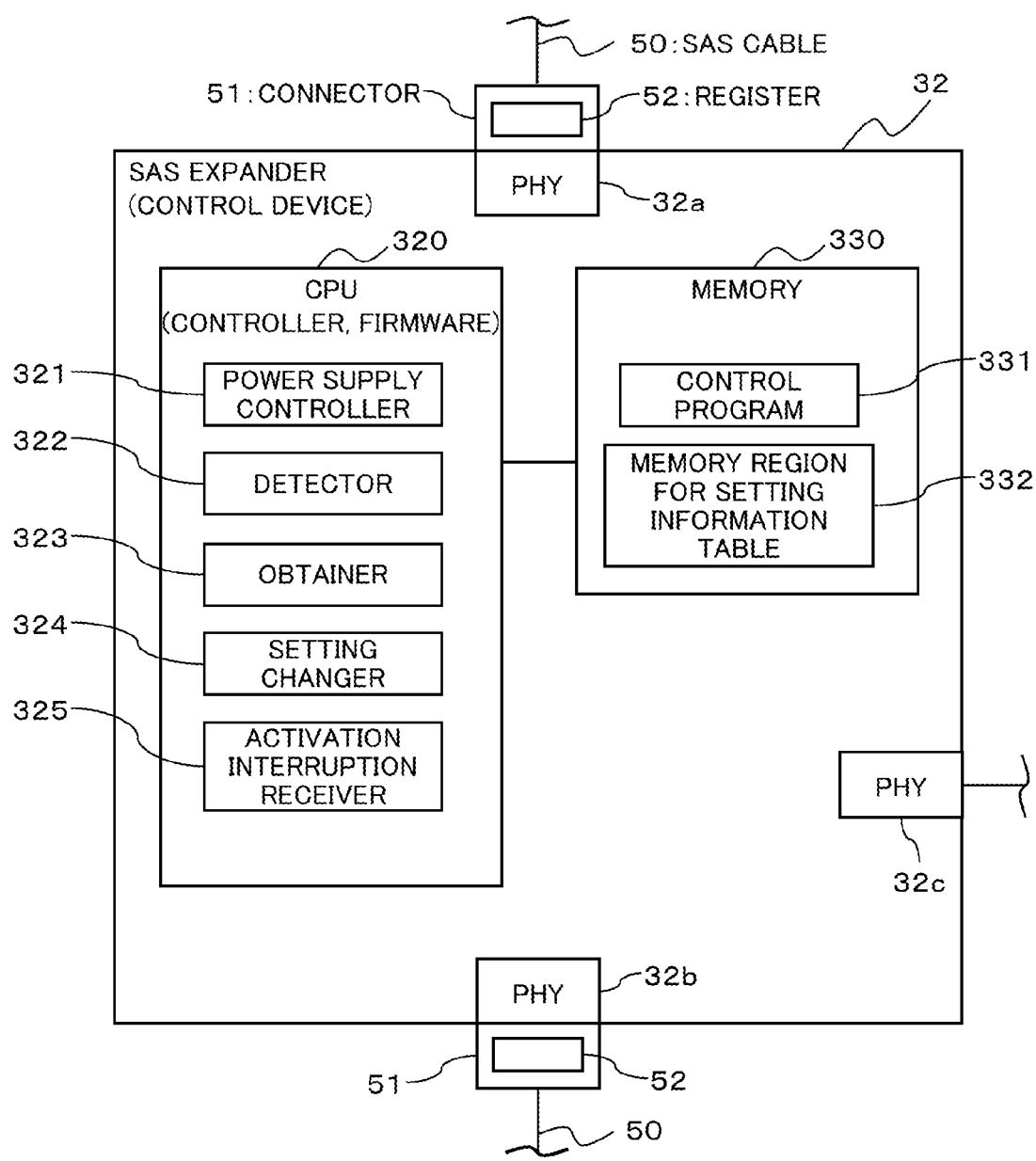
FIG. 2 is a block diagram schematically illustrating an example of the hardware and functional configurations of a control device (SAS expander) according to the first embodiment of the present invention.

First, description will now be made in relation to the hardware and functional configurations of the SAS expander 32 of the first embodiment of the present invention by referring to FIG. 2. FIG. 2 is a block diagram illustrating an example of the hardware and functional configurations of the SAS expander 32.

The SAS expander 32 of the first embodiment includes at least SAS ports 32a-32c, a CPU 320, and a memory 330.

As described above by referring to FIG. 1, the SAS port 32a is an upper connection port connected to the SAS port 109 of the CM 100 or to an SAS port (lower connection port) 32b of the SAS expander 32 included in another DE 30 via the SAS cable 50.

Also as described above by referring to FIG. 1, the SAS port 32b is a lower connection port connected to an SAS port (upper connection port) 32a of the SAS expander 32 included in another DE 30 via the SAS cable 50.

The SAS port 32c is a port (PHY) connected to each disk 31 included in the DE 30.

One port is illustrated for each of the SAS ports 32a-32c in FIGS. 1 and 2. Alternatively, two or more ports may be provided for each of the SAS ports 32a-32c.

The memory 330 is a memory device, such as a Random Access Memory (RAM), that stores therein various pieces of data and a program. The memory 330 stores therein a control program 331 that causes the CPU 320 to function as a controller (firmware) of the SAS expander 32. In addition, the memory 330 includes a memory region 332 for a setting information table that stores therein a setting information table being related to the setting information of the type of SAS cable and being depicted in FIG. 3.

The control program 331 is provided in the form of being recorded in a non-transitory computer-readable portable recording medium. Examples of the recording medium are a magnetic disk, an optical disk, and a magneto-optical disk. Examples of an optical disk are a Compact Disk (CD), a Digital Versatile Disk (DVD), and a Blu-ray disk. Examples of a CD are a CD-ROM (Read Only Memory), and a CD-R(Recordable)/RW(ReWritable). Examples of a DVD are a DVD-RAM, a DVD-ROM, a DVD-R, a DVD+R, a DVD-RW, a DVD+RW, and a HD (High Definition) DVD.

The CPU 320 reads the control program 331 from the recording medium and stores the read control program 331 into an internal memory device (e.g., memory 330) or into an external memory device for later use. Alternatively, the CPU 320 may receive the control program 331 through a network (not illustrated) and store the control program 331 in an internal or external memory device for later use.

A setting information table stored in the memory region 332 for a setting information table includes, for example, information as illustrated in FIG. 3. FIG. 3 is a diagram illustrating an example of the setting (setting information table) for each type of the SAS cable 50. As described above, the embodiments (the first and second embodiments) of the present invention use either one of a Copper cable and an AOC cable as the SAS cable 50 that connects SAS ports. As described above, the SAS expander 32 or 32A is configured to be capable of dealing with both a Copper cable and an AOC cable.

As illustrated in FIG. 3, the CPU 320 sets the following contents for each type of SAS cable in the setting information table. The setting contents include setting for a communication device, such as on/off information of a Vact and Ptt, for each type of SAS cable 50. Specifically, in cases where the type of SAS cable 50 connected to the SAS port 32a is a Copper cable, Vact is set to "off" while Ptt is set to "on". When the type of SAS cable 50 connected to the SAS port 32a is an AOC cable, Vact is set to "on" while Ptt is set to "off". The terms "Vact" and "Ptt" are abbreviations for "Voltage for active cable" and "Physical transmitter training", respectively.

As illustrated in FIG. 2, for example, the SAS cable 50 of the first and second embodiments has a connector 51 disposed at an end thereof and a register 52 is attached to the connector 51. The connector 51 is plugged into and unplugged from the SAS ports 32a and 32b. Whether the connector 51 (SAS cable 50) is unplugged and plugged is detectable by the CPU 320 (detector 322). Into the register 52, type information (whether the SAS cable 50 is a Copper cable or an AOC cable) representing the type of SAS cable 50 is stored. The type information of the SAS cable 50 stored in the register 52 is obtainable by the CPU 320 (obtainer 323).

The CPU 320 functions as a controller that controls the disks 31 in the DE 30 by executing the control program 331 stored in the memory 330. Specifically, the CPU 320 of the first embodiment functions as at least a power supply controller 321, a detector 322, an obtainer 323, a setting changer 324, and an activation interruption receiver 325.

The CPU 320 may also be referred to as a controller, a processor, a computer, firmware, and an expander chip. The controller may be achieved by a Micro Processing Unit (MPU), a Digital Signal Processor (DSP), an Application Specific Integrated Circuit (ASIC), a Programmable Logic Device (PLD), and a Field Programmable Gate Array (FPGA) in place of the CPU 320. Further alternatively, the controller may be a combination of two or more of a CPU, an MPU, a DSP, an ASIC, a PLD, and an FPGA.

The consumption-power saving mode of the first embodiment corresponds to a first power saving mode that stops power supply to the disks 31 and the functional elements, in the SAS expander 32, except for the activation interruption receiver 325.

Here, the activation interruption receiver 325 receives, as activation interruption, an SAS packet (OOB) to restore the power supply state into a normal power supply mode in the first power saving mode. The function of the activation interruption receiver 325 of the first embodiment is achieved by the CPU 320, but alternatively, may be achieved by a different hardware device from the CPU 320.

The power supply controller 321 accomplishes the function of Wake on SAS. In other words, when the SAS port 32a comes to be in the unused state in the normal power supply mode, the power supply controller 321 shifts the power supply state to the disks 31 and the SAS expander 32 from the normal power supply mode into a first power saving mode in which activation interruption can be received. When an SAS packet (OOB) is received as activation interruption (link-up interruption) in the first power saving mode, the power supply controller 321 is activated and shifts the power supply state from the first power saving mode into the normal power supply mode.

Here, the power supply controller 321 of the first embodiment has a function of monitoring a link-up state of an SAS port 32a. Upon detection of continuing the link-down state of the SAS port 32a for a predetermined time period (e.g., two seconds) by using this function, the power supply controller 321 determines that the SAS port 32a is in unused state.

Specifically, the power supply controller 321 of the first embodiment is activated at a predetermined timing (e.g., at every one second) in the first power saving mode by using a timer function, and then temporarily supplies power to the SAS expander 32. When power is temporarily supplied to the SAS expander 32, only the SAS expander 32 is activated while the DC-power supply to the disks 31 and a Light Emitting Diode (LED, not illustrated) is remained to be "off" state (DC off).

The detector 322 detects, in the first power saving mode, whether the mounting state of the SAS cable 50 has been changed, which means, whether the SAS cable 50 (connector 51) has been unplugged from and plugged into the SAS port 32a.

When the detector 322 detects unplugging and plugging of the SAS cable 50, the obtainer 323 obtains type information representing the type of the SAS cable 50. In this event, the obtainer 323 reads the type information of the replacement SAS cable 50 that has been newly-plugged into the register 52 attached to the SAS cable 50.

Using the type information obtained by the obtainer 323 as a key, the setting changer 324 retrieves the setting (e.g., setting for a communication device) associated with the type information from the setting information table (see FIG. 3) that is expanded from the memory region 332 of the memory 330 on the CPU 320. Then the setting changer 324 changes the setting of the SAS cable 50 held in the CPU 320 into setting corresponding to the obtained type information.

When the detector 322 detects no unplugging and plugging (replacement) of the SAS cable 50 or when the setting changer 324 completes the changing of the setting of the SAS cable 50, the power supply controller 321 finishes the temporal power supply to the SAS expander 32. Consequently, the power supply state to the disks 31 and the SAS expander 32 comes into the first power saving mode.

Figure 4:
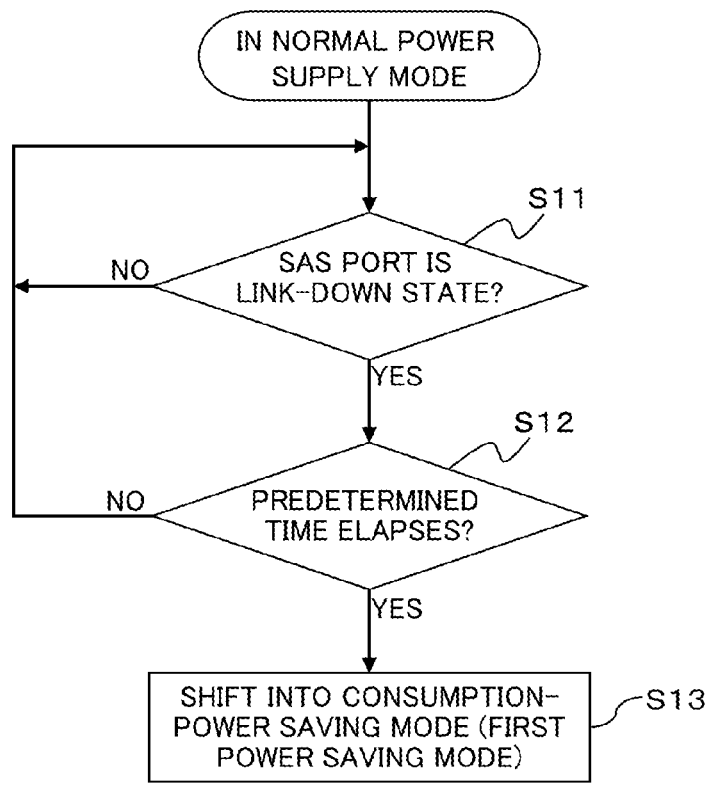
FIG. 4 is a flow diagram denoting a succession of procedural steps of an operation in a normal power supply mode in the first embodiment.

Next, description will now be made in relation to the operation of the above SAS expander 32 of the first embodiment in the normal power supply mode with reference to a flow diagram FIG. 4 (steps S11-S13).

In the normal power supply mode, the power supply controller 321 monitors the link-up state of the SAS port 32a (steps S11, S12). If the monitoring detects the link-down state of the SAS port 32a (YES route in step S11), the power supply controller 321 further determines whether the link-down state is continuing for a predetermined time period (e.g., two seconds) (step S12). In cases where multiple SAS ports 32a are provided, each SAS port 32a is determined as to whether the link-down state of the SAS port 32a continues for the predetermined time period.

If the SAS port 32a is not in the link-down state (NO route in step S11) or when the link-down state has been continuing for a time less than the predetermined time period (Yes route in step S11 and NO route in step S12), the power supply controller 321 returns to the process of step S11.

In contrast, if the link-down state is continuing for the predetermined time period (YES route in step S12), the power supply controller 321 determines that the SAS port 32a is in the unused state. When determining that the SAS port 32a has come into the unused state, the power supply controller 321 shifts the power supply state to the disks 31 and the SAS expander 32 from the normal power supply mode to the first power saving mode (step S13).

Figure 5:
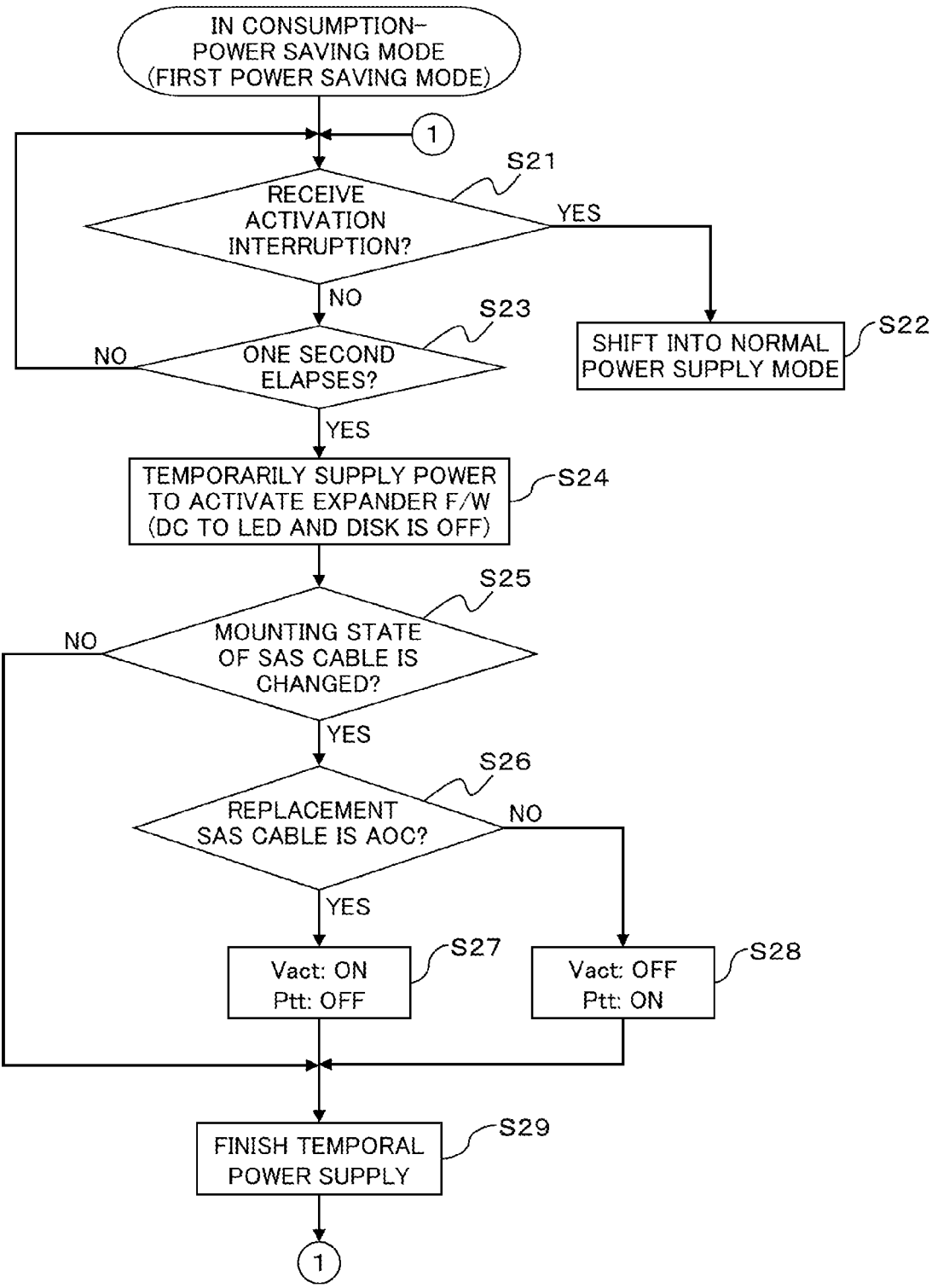
FIG. 5 is a flow diagram denoting a succession of procedural steps of an operation in a consumption-power saving mode (first power saving mode) in the first embodiment.

Next, description will now be made in relation to the operation of the SAS expander 32 of the first embodiment when being shifted into the first power saving mode as the above with reference to a flow diagram FIG. 5 (steps S21-S29).

In the first power saving mode, the SAS expander 32 determines whether the activation interruption receiver 325 receives an SAS packet (OOB) as activation interruption (link-up interruption) (step S21). If the activation interruption receiver 325 receives an SAS packet (OOB) (YES route in step S21), the power supply controller 321 is activated and shifts the power supply state from the first power saving mode to the normal power supply mode (step S22). This makes the DE 30 (the disks 31 and the SAS expander 32) into an on-line operating state.

In contrast, if the activation interruption receiver 325 does not receive an SAS packet (OOB) (NO route in step S21), the power supply controller 321 determines, by using a timer function or the like, whether one second elapses (step S23). If one second does not elapse (NO route in step S23), the power supply controller 321 returns to the process of step S21.

In contrast, if one second elapses (YES route in step S23), which means that unless activation interruption is not received, the power supply controller 321 is activated at every one second and temporarily supplies power to the SAS expander 32 (CPU 320) (step S24). In this event, only the SAS expander 32 is activated while the DC-power supply to the disks 31 and the LED is remained to be "off" state.

After the temporal power supply to the SAS expander 32 (CPU 320) is started, the detector 322 detects whether the mounting state of the SAS cable 50 has been changed, which means, whether the SAS cable 50 has been unplugged from and plugged into the SAS port 32a (step S25).

When the detector 322 detects no unplugging and plugging of the SAS cable 50 (NO route in step S25), the power supply controller 321 finishes the temporal power supply to the SAS expander 32 (step S29). This turns the power supply state to the disks 31 and the SAS expander 32 into the first power saving mode. After that, the CPU 320 returns to the process of step S21.

When the detector 322 detects unplugging and plugging of the SAS cable 50 (YES route in step S25), the obtainer 323 obtains type information representing the type of the SAS cable 50. Then the obtainer 323 determines whether the replacement SAS cable 50 (the SAS cable 50 newly plugged into the connector 51) is an AOC cable (step S26). In this determination, the obtainer 323 obtains the type information of the replacement SAS cable 50 from the register 52 attached to the replacement SAS cable 50.

If the replacement SAS cable 50 is an AOC cable (YES route in step S26), the setting changer 324 obtains the setting (i.e., Vact=on; Ptt=off) determined for an AOC cable by referring to the setting information table (see FIG. 3) and changes the setting of the SAS cable in the CPU 320 into the obtained setting (step S27). After that, the CPU 320 moves to step S29.

If the replacement SAS cable 50 is not an AOC cable (NO route in step S26), the setting changer 324 determines that the replacement SAS cable 50 is a Copper cable. Then, the setting changer 324 obtains the setting (i.e., Vact=off; Ptt=on) determined for a Copper cable by referring to the setting information table (see FIG. 3) and changes the setting of the SAS cable in the CPU 320 into the obtained setting (step S28). After that, the CPU 320 moves to step S29.

As described above, after the function for Wake on SAS shifts the power supply state to the first power saving mode in the SAS expander 32 of the first embodiment, the presence of a change in mounting state of the SAS cable 50 being connected to the SAS port 32a is checked regularly (e.g., at every one second). In other words, SAS expander 32 in the first power saving mode is temporarily supplied with power at regular intervals, so that the SAS expander 32 (CPU 320) is regularly activated, keeping the disks 31 and the LED to be in the "off" state. This can regularly check a change in mounting state of the SAS cable 50.

If the above regular check detects a change in the mounting state of the SAS cable 50, the necessary setting (Vact, Ptt) is changed and then the temporal power supply to the SAS expander 32 (CPU 320) is finished. Consequently, the power supply state comes into the first power saving mode again. After that, if the SAS expander 32 receives activation interruption after the upper connection port 32a of the SAS expander 32 comes into a link-up state, the SAS expander 32 can be avoided from falling into a dead-lock state and can activate the DE 30 by means of the function of Wake on SAS.

Accordingly, even when the SAS cable 50 is replaced with a different type of SAS cable 50 during the first power saving mode, the SAS expander 32 of the first embodiment can surely restore the power supply state into the normal power supply mode. This means that, even when the SAS cable 50 is clod-swapped with a different type of cable in the first power saving mode, the SAS expander 32 can receive an SAS packet (OOB) as activation interruption to cancel the dead-lock state. This enables the function for Wake on SAS to effectively operate. Consequently, this allows the DE 30 to operate while saving the consumption power by effectively using the function for Wake on SAS.

(4) Modification to the First Embodiment

If the type of the unplugged SAS cable 50 is the same as the type of the newly-plugged replacement SAS cable 50, the setting of the SAS cable 50 is unchanged between the unplugging and the plugging and there is no need to change the setting of the SAS cable 50. However, even in this case, the obtainer 323 and the setting changer 324 of the first embodiment unnecessarily change the setting of the SAS cable 50 in steps S26-S28 of FIG. 5.

Figure 6:
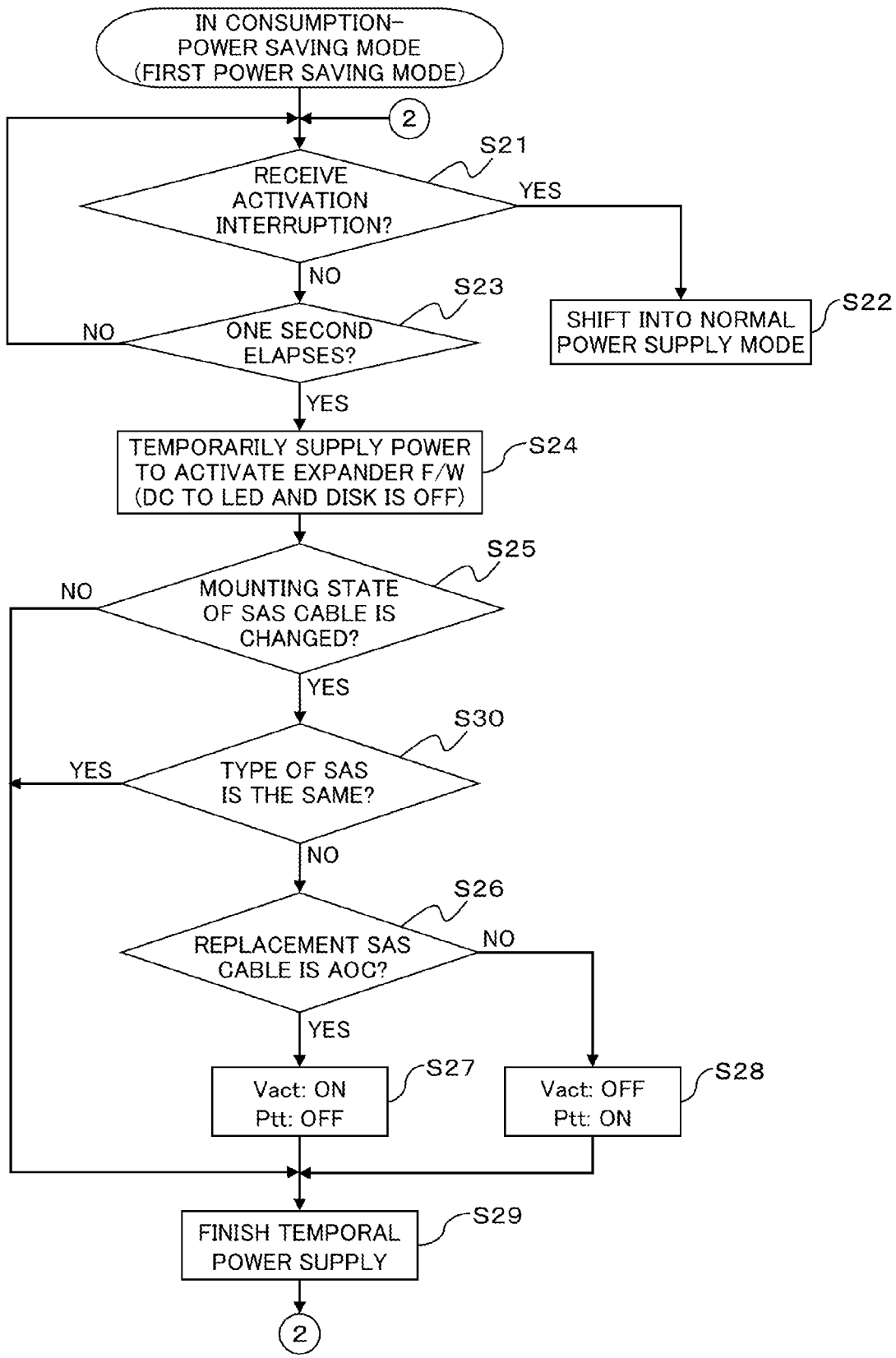
FIG. 6 is a flow diagram denoting a succession of procedural steps of an operation in a consumption-power saving mode (first power saving mode) in a modification to the first embodiment.

As a solution to the above, if the setting of the SAS cable 50 is unchanged between the unplugging and the plugging, the obtainer 323 and the setting changer 324 of the SAS expander 32 of this modification to the first embodiment skip the changing of the setting of the SAS cable 50 (see steps S26-S28 of FIG. 6). In other words, the obtainer 323 and the setting changer 324 of this modification to the first embodiment have an additional function of skipping, if the type of the SAS cable 50 is unchanged between the unplugging and the plugging, a process of changing the setting of the SAS cable 50.

Next, description will now be made in relation to the operation of the SAS expander 32 of the modification to the first embodiment after being shifted into the first power saving mode with reference to a flow diagram FIG. 6 (steps S21-S30). The flow diagram FIG. 6 of the modification to the first embodiment additionally has step S30 between steps S25 and S26 of the flow diagram FIG. 5. Here, the description will focus on the process related to step S30. The steps in FIG. 6 having the same number as those in step S5 designate the same or the substantially same process as those in FIG. 5.

When the detector 322 detects unplugging and plugging of the SAS cable 50 (YES route in step S25), the obtainer 323 obtains type information representing the type of the SAS cable 50. The obtainer 323 determines whether the type of the unplugged SAS cable 50 is the same as the type of the newly-plugged replacement SAS cable 50 (step S30).

If the types are the same (YES route in step S30), the CPU 320 skips steps S26-S28 and moves to step S29. In contrast, if the type of the unplugged SAS cable 50 is not the same as the type of the newly-plugged replacement SAS cable 50 (NO route in step S30), the CPU 320 moves to step S26.

As the above, in this modification to the first embodiment, when the SAS cable 50 is replaced with the same type of cable (Copper cable or AOC cable), the setting of the SAS cable 50 is unchanged to allow the process of steps S26-S28 in FIG. 6 to be skipped or omitted. This can prevent the controller 320 from carrying out unnecessary changing of the setting of the SAS cable 50, which contributes to improving process efficiency and saving consumption power.

(5) Second Embodiment

Figure 7:
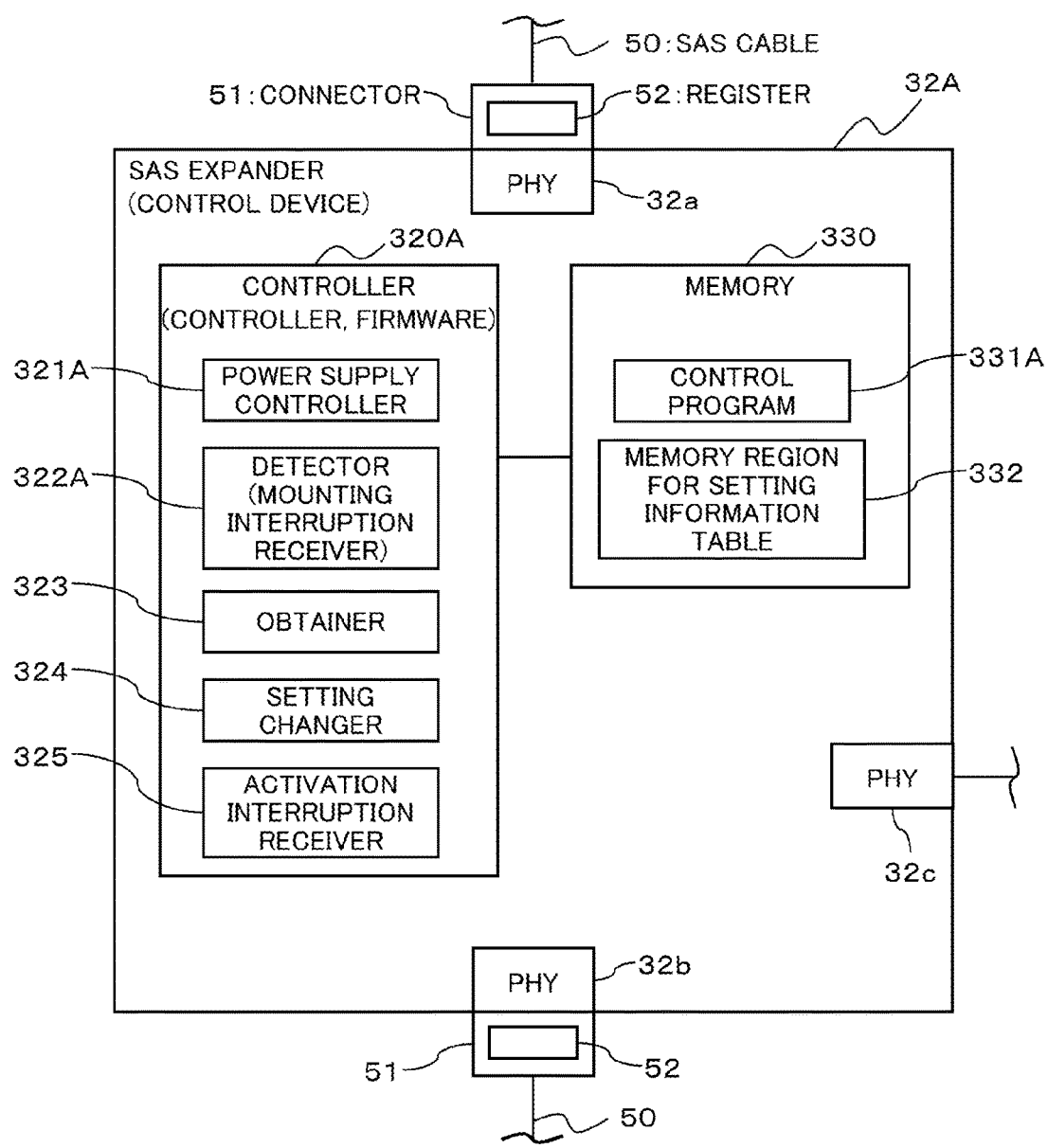
FIG. 7 is a block diagram schematically illustrating an example of the hardware and functional configurations of a control device (SAS expander) according to the second embodiment of the present invention.
Figure 8:
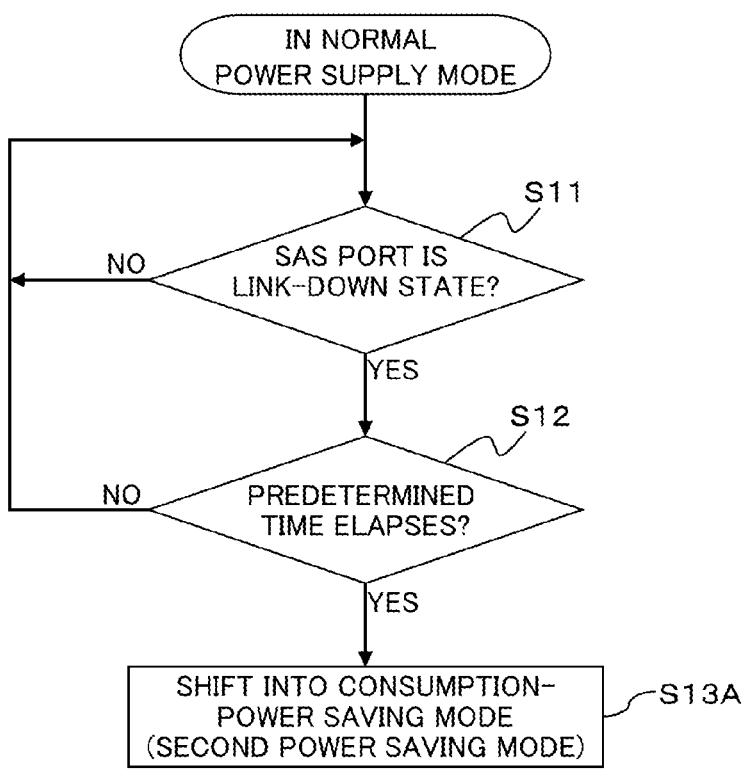
FIG. 8 is a flow diagram denoting a succession of procedural steps of an operation in a normal power supply mode in the second embodiment.
Figure 9:
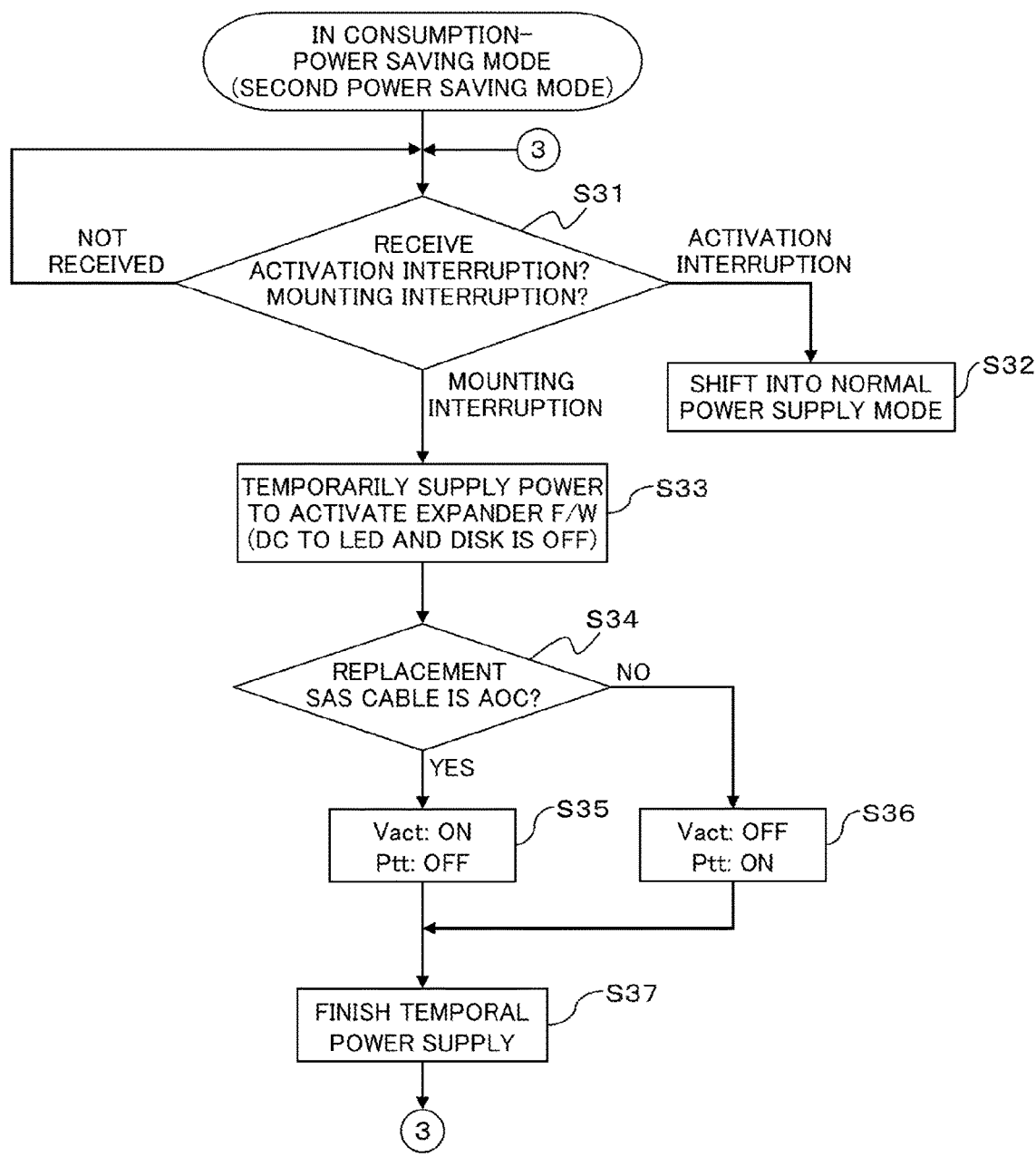
FIG. 9 is a flow diagram denoting a succession of procedural steps of an operation in a consumption-power saving mode (second power saving mode) in the second embodiment.

Next, description will now be made in relation to the controlling device (SAS expander) 32A of the second embodiment with reference to FIGS. 7-9.

First, description will now be made in relation to the hardware and functional configurations of the SAS expander 32A of the second embodiment with reference to FIG. 7. FIG. 7 is a block diagram schematically illustrating an example of the hardware and functional configurations. Like reference numbers in FIG. 7 designate the same or substantially same elements and parts as those described above.

The SAS expander 32A of the second embodiment includes at least the SAS ports 32a-32c, a controller 320A, and the memory 330.

The memory 330 stores therein a control program 331A that causes the CPU 320A to function as the controller of the SAS expander 32A in place of the control program 331 of the first embodiment.

The control program 331A is provided in the form of being recorded in a non-transitory computer-readable portable recording medium. Examples of the recording medium are a magnetic disk, an optical disk, and a magneto-optical disk. Examples of an optical disk is a CD, a DVD, and a Blu-ray disk. Examples of a CD are a CD-ROM, and a CD-R/RW. Examples of a DVD are a DVD-RAM, a DVD-ROM, a DVD-R, a DVD+R, a DVD-RW, a DVD+RW, and a HD DVD.

The CPU 320A reads the control program 331A from the recording medium and stores the read control program 331A into an internal memory device (e.g., memory 330) or into an external memory device for later use. Alternatively, the CPU 320A may receive the control program 331A through a network (not illustrated) and store the control program 331A in an internal or external memory device for later use.

The CPU 320A functions as a controller that controls the disks 31 in the DE 30 by executing the control program 331A stored in the memory 330. Specifically, the CPU 320A of the second embodiment functions as at least a power supply controller 321A, a detector (mounting interruption receiver) 322A, an obtainer 323, a setting changer 324, and an activation interruption receiver 325.

The CPU 320A may also be referred to as a controller, a processor, a computer, firmware, and an expander chip. The controller may be an MPU, a DSP, an ASIC, a PLD, and an FPGA in place of the CPU 320A. Further alternatively, the controller may be achieved by a combination of two or more of a CPU, an MPU, a DSP, an ASIC, a PLD, and an FPGA.

The consumption-power saving mode of the second embodiment corresponds to a second power saving mode that stops power supply to the disks 31 and the functional elements in the SAS expander 32A except for the activation interruption receiver 325 and the detector 322A.

Here, the activation interruption receiver 325 receives, as activation interruption, an SAS packet (OOB) to restore the power supply state into a normal power supply mode in the second power saving mode likewise the first embodiment. The detector (mounting interruption receiver) 322A receives, in the second power saving mode, mounting interruption, which is issued when, for example, the SAS cable 50 (connector 51) is unplugged and plugged (in other words, the SAS cable 50 is replaced with another). The functions of the activation interruption receiver 325 and the detector 322A of the second embodiment are achieved by the CPU 320A, but alternatively, may be achieved by a different hardware device from the CPU 320A.

Upon receipt of mounting interruption of the SAS cable 50 in the second power saving mode, the detector (mounting interruption receiver) 322A detects the receipt as a change in the mounting state of the SAS cable 50. In other words, the detector 322A detects unplugging and plugging of the SAS cable 50 (connector 51) from and into the SAS port 32a when receiving mounting interruption.

The power supply controller 321A accomplishes the function of Wake on SAS. In other words, when the SAS port 32a comes to be in the unused state in the normal power supply mode, the power supply controller 321A shifts the power supply state to the disks 31 and the SAS expander 32A from the normal power supply state into a second power saving mode in which activation interruption and mounting interruption can be received. When an SAS packet (OOB) is received as activation interruption (link-up interruption) in the second power saving mode, the power supply controller 321A is activated and shifts the power supply state from the second power saving mode into the normal power supply mode.

Here, the power supply controller 321A of the second embodiment includes a function of monitoring a link-up state of an SAS port 32a. Upon detection of continuing the link-down state of the SAS port 32a for a predetermined time period (e.g., two seconds) by using this function, the power supply controller 321A determines that the SAS port 32a is in the unused state.

In particular, when the detector 322A detects the reception of mounting interruption, as a change in the mounting state of the SAS cable 50, the power supply controller 321A temporarily supplies power to the SAS expander 32A. Likewise the first embodiment, when power is temporarily supplied to the SAS expander 32A, only the SAS expander 32A is activated while the DC-power supply to the disks 31 and a Light Emitting Diode (LED, not illustrated) is remained to be "off" state.

Likewise the first embodiment, when the detector 322A detects unplugging and plugging (mounting interruption) of the SAS cable 50, the obtainer 323 obtains type information representing the type of the SAS cable 50. In this event, the obtainer 323 reads the type information of the SAS cable 50 that has been plugged into the register 52 attached to the SAS cable 50.

Likewise the first embodiment, using the type information obtained by the obtainer 323 as a key, the setting changer 324 retrieves the setting (e.g., setting for a communication device) associated with the type information from the setting information table (see FIG. 3) that is expanded from a memory region 332 of the memory 330 on the CPU 320A. Then the setting changer 324 changes the setting of the SAS cable 50 in the CPU 320A into setting corresponding to the obtained type information.

In the second embodiment, after the setting changer 324 completes the changing of the setting of the SAS cable 50, the power supply controller 321A finishes the temporal power supply to the SAS expander 32A. Consequently, the power supply state to the disks 31 and the SAS expander 32A comes into the second power saving mode.

Next, description will now be made in relation to the operation of the above SAS expander 32A of the second embodiment in the normal power supply mode with reference to a flow diagram FIG. 8 (steps S11, S12, S13A).

In the normal power supply mode, the power supply controller 321A monitors the link-up state of the SAS port 32a (steps S11, S12) likewise the first embodiment. If the monitoring detects the link-down state of the SAS port 32a (YES route in step S11), the power supply controller 321A further determines whether the link-down state is continuing for a predetermined time period (e.g., two seconds) (step S12). In cases where multiple SAS ports 32a are provided, each SAS port 32a is determined as to whether the link-down state of the SAS port 32a continues for the predetermined time period.

If the SAS port 32a is not in the link-down state (NO route in step S11) or when the link-down state is continuing for a time less than the predetermined time period (Yes route in step S11 and NO route in step S12), the power supply controller 321A returns to the process of step S11.

In contrast, if the link-down state is continuing for the predetermined time period (YES route in step S12), the power supply controller 321A determines that the SAS port 32a is in the unused state. When determining that the SAS port 32a has come into the unused state, the power supply controller 321A shifts the power supply state to the disks 31 and the SAS expander 32A from the normal power supply mode to the second power saving mode (step S13A).

Next, description will now be made in relation to the operation of the above SAS expander 32A of the second embodiment in the second power saving mode with reference to a flow diagram FIG. 9 (steps S31-S37).

In the second power saving mode, the SAS expander 32A first determines whether the activation interruption receiver 325 has received activation interruption or whether the detector (mounting interruption receiver) 322A has received mounting interruption (step S31). If no interruption has been received (see the "NOT RECEIVED" route in step S31, the CPU 320A returns to the process of step S31. In contrast, if activation interruption has been received (see "ACTIVATION INTERRUPTION" route in step S31), the power supply controller 321A is activated and shifts the power supplying state from the second power saving mode to the normal power supply mode (step S32). This made the DE 30 (the disks 31 and the SAS expander 32A) into an on-line operating state.

On the other hand, if mounting interruption has been received (see "MOUNTING INTERRUPTION" route in step S31), the power supply controller 321A is activated and temporarily supplies power to the SAS expander 32A (CPU 320A) (step S33). In this event, only the SAS expander 32A is activated while the DC-power supply to the disks 31 and the LED is remained to be "off" state.

During the above temporal power supply, the obtainer 323 obtains the type information representing the type of the SAS cable 50. Then the obtainer 323 determines whether the replacement SAS cable 50 (the SAS cable 50 newly plugged into the connector 51) is an AOC cable (step S34). In this determination, the obtainer 323 obtains the type information of the replacement SAS cable 50 from the register 52 attached to the replacement SAS cable 50.

If the replacement SAS cable 50 is an AOC cable (YES route in step S34), the setting changer 324 obtains the setting (i.e., Vact=on; Ptt=off) determined for an AOC cable by referring to the setting information table (see FIG. 3) and changes the setting of the SAS cable in the CPU 320A into the obtained setting (step S35). After that, the CPU 320A moves to step S37.

If the replacement SAS cable 50 is not an AOC cable (NO route in step S34), the setting changer 324 determines that the replacement SAS cable 50 is a Copper cable. Then, the setting changer 324 obtains the setting (i.e., Vact=off; Ptt=on) determined for a Copper cable by referring to the setting information table (see FIG. 3) and changes the setting of the SAS cable in the CPU 320A into the obtained setting (step S36). After that, the CPU 320A moves to step S37.

When the setting changer 324 completes the change of the setting of the SAS cable 50, the power supply controller 321A finishes the temporal power supply to the SAS expander 32A (step S37). Thereby, the power supply state to the disks 31 and the SAS expander 32A comes into the second power saving mode. Then the CPU 320A returns to the process of step S31.

The specification of the traditional technique restores the power supply state to the normal power supply mode by the function of Wake on SAS only when the SAS expander receives an SAS packet (activation interruption). Accordingly, when the SAS expander receives mounting interruption after shifting into a power saving mode, the SAS expander ignores the interruption.

As described above, upon receipt of mounting interruption of the SAS cable 50 after the power supply state of the SAS expander 32A of the second embodiment has been shifted into the second power saving mode through the function for Wake on SAS, the SAS expander 32A is temporarily supplied with power. This makes it possible to activate the SAS expander 32A (CPU 320A) while the power supply to the disks 31 and the LED is kept to be "off" state.

Consequently, the necessary setting (Vact, Ptt) is changed and then the temporal power supply to the SAS expander 32A (CPU 320A) is finished. Consequently, the power supply state comes into the second power saving mode again. If the SAS expander 32A receives activation interruption after the upper connection port 32a of the SAS expander 32A comes to be in a link-up state, the SAS expander 32A can be avoided from falling into a dead-lock state and can activate the DE 30 by means of the function of Wake on SAS.

Accordingly, the SAS expander 32A of the second embodiment achieves the same effects as those of the first embodiment.

In particular, employing the above method of controlling, the CPU (expander firmware) 320A of the SAS expander 32A of the second embodiment is activated only once immediately after the SAS cable 50 is unplugged and plugged, necessarily changes the setting, and then, immediately returns to the second power saving mode. With this configuration, the second embodiment eliminates regular activation of the CPU (expander firmware) 320A as performed in the first embodiment, so that power is not unnecessarily consumed.

(6) Modification to the Second Embodiment

Also as described in the above modification to the first embodiment, if the type of an unplugged SAS cable 50 is the same as the type of the newly-plugged replacement SAS cable 50, the setting of the SAS cable 50 is unchanged between the unplugging and the plugging and there is no need to change the setting of the SAS cable 50. However, even in this case, the obtainer 323 and the setting changer 324 of the second embodiment unnecessarily change the setting of the SAS cable 50 in steps S34-S36 of FIG. 9.

Figure 10:
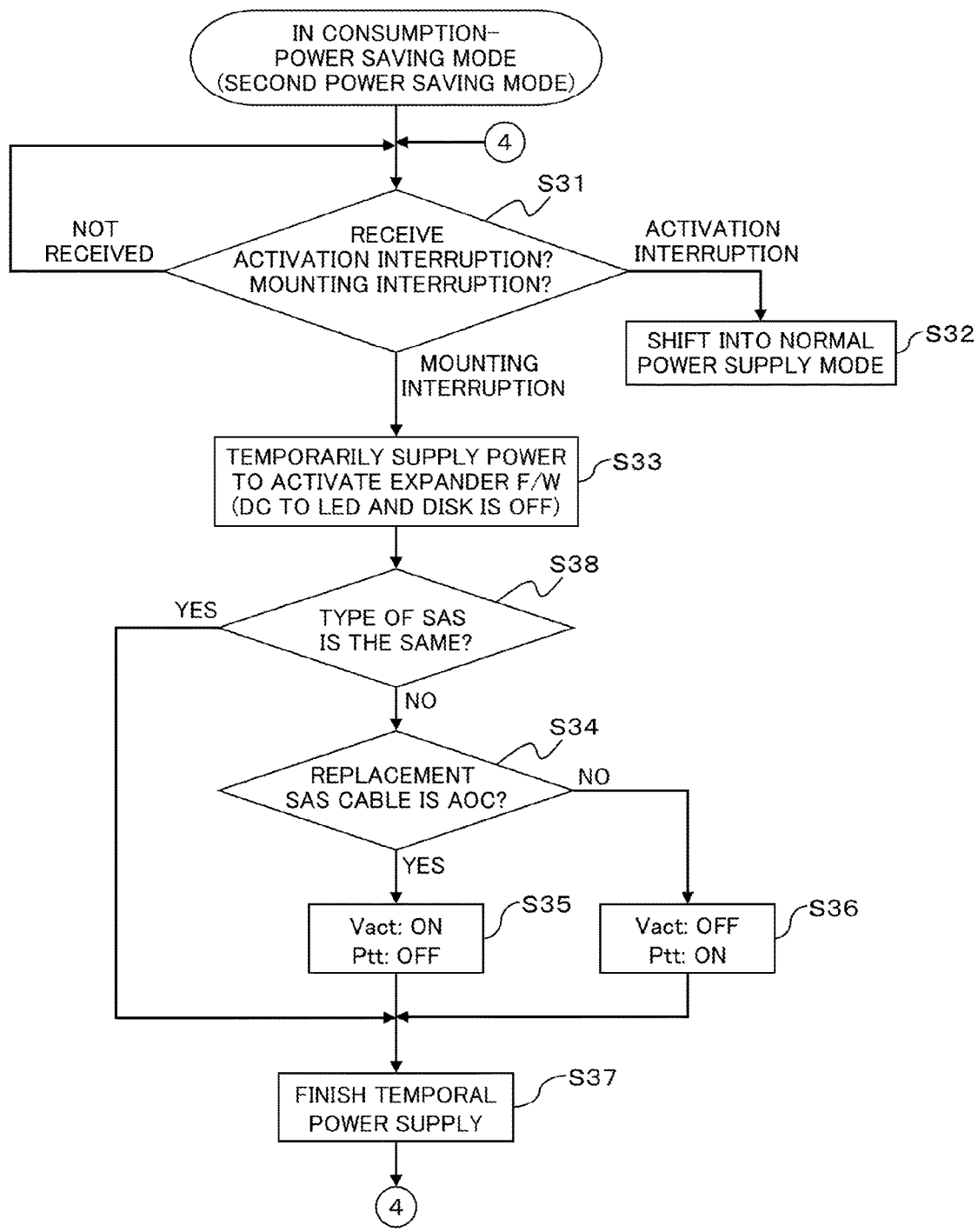
FIG. 10 is a flow diagram denoting a succession of procedural steps of an operation in a consumption-power saving mode (second power saving mode) in a modification to the second embodiment.

As a solution to the above, if the setting of the SAS cable 50 is unchanged between the unplugging and the plugging, the obtainer 323 and the setting changer 324 of the SAS expander 32A of this modification to the second embodiment skip the changing of the setting of the SAS cable 50 (see steps S34-S36 of FIG. 10). In other words, the obtainer 323 and the setting changer 324 of this modification to the second embodiment each have an additional function of skipping, if the setting of the SAS cable 50 is unchanged between the unplugging and the plugging, a process of changing the setting of the SAS cable 50.

Next, description will now be made in relation to the operation of the SAS expander 32A of the modification to the second embodiment after being shifted into the second power saving mode with reference to a flow diagram FIG. 10 (steps S31-S38). The flow diagram FIG. 10 of the modification to the second embodiment additionally has step S38 between steps S33 and S34 of the flow diagram FIG. 9. Here, the description will focus on the process related to step S38. The steps in FIG. 10 having the same number as those in steps designate the same or the substantially same process as those described above.

Under a state of the temporal power supply in step S33, the obtainer 323 obtains type information representing the type of the SAS cable 50. The obtainer 323 determines whether the type of the unplugged SAS cable 50 is the same as the type of the newly-plugged replacement SAS cable 50 (step S38).

If the types are the same (YES route in step S38), the CPU 320A skips steps S34-S36 and moves to the process of step S37. In contrast, if the type of the unplugged SAS cable 50 is not the same as the type of the newly-plugged replacement SAS cable 50 (NO route in step S38), the CPU 320A moves to step S34.

As the above, in the modification to the second embodiment, when the SAS cable 50 is replaced with the same type of cable (Copper cable or AOC cable), the setting of the SAS cable 50 is unchanged to allow the process of steps S34-S36 to be skipped or omitted. This can prevent the CPU 320A from carrying out unnecessary changing of the setting of the SAS cable 50, which contributes to improving process efficiency and saving consumption power.

(7) Others

Preferred embodiments of the present invention are described above. However, the present invention is not limited to the embodiments and various changes and modifications can be suggested without departing from the spirit of the present invention.

In the above first and second embodiments and modifications thereof, the SAS expanders 32 and 32A are applied to storage devices. However, the present invention is not limited to this. Alternatively, the SAS expanders 32 and 32A may be applied to a server device or a switch device and bring the same advantages as those of the foregoing embodiments and modifications.

The first and second embodiments and the modifications thereof assume that the SAS cable is of two types of a Copper cable and an AOC cable. However, the types of SAS cable are not limited to these and alternatively may be three types or more. This alternative can be applied likewise the foregoing embodiments and obtain the same effects. It should be noted that a setting information table that defines the setting of three or more types of SAS cable is prepared and used.

The above first and second embodiments and the modifications thereof change the setting of the SAS cable 50 to be unplugged-from and plugged-into the upper connection port (SAS input port) 32a. However, the present invention is not limited to this. Alternatively, the present invention can be applied to both the upper connection port (SAS input port) 32a and the lower connection port (SAS output port) 32b, which brings the same effects as those of the foregoing embodiments.

The SAS expander (control device) may select either of the control method of the first embodiment and the modification thereof or the control method of the second embodiment and the modification thereof. This can select a control method according to the demand of the user and therefore contribute to the user's convenience.

The above first and second embodiments and the modifications thereof assume that the control target device of the SAS expanders 32, 32A is the disk (memory device) mounted on the DE 30. However, the control target device of the present invention is not limited to this. Alternatively, a control target device may be another device. The foregoing embodiments can also be applied to the alternative target device and obtain the same effects.

The embodiments described herein can surely restore the power supply state to the normal power supply mode even if a cable is replaced with a different type of cable in a power saving mode.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. A control device comprising a processor that controls a target device, the processor being configured to:
   monitor a link state of an upper connection port connected to another upper device via a cable;
   determine that the upper connection port comes into an unused state when detecting a continuation of a link-down state of the upper connection port as the link state;
   shift, when the processor determines that the upper connection port comes into the unused state, a power supply state to the target device and to the control device from a normal power supply mode into a power saving mode capable of receiving activation interruption from the another upper device;
   detect a cable type change of the cable upon receipt of mounting interruption supplying power to the control device temporarily in the power-saving mode;
   obtain, when the processor detects the cable type change, type information representing a type of the cable; and
   change setting of the cable in accordance with the type information obtained by the processor.

2. The control device according to claim 1, wherein when the activation interruption is received in the power-saving mode, the processor shifts the power supply state from the power saving mode to the normal power supply mode.

3. The control device according to claim 1, wherein when the setting of the cable before changing by the processor is the same as setting after the changing, the processor omits operation to change the setting of the cable.

4. The control device according to claim 1, wherein the processor obtains the type information by reading the type information from a register attached to the cable.

5. The control device according to claim 1, wherein
   the power saving mode is a first power saving mode that stops power supply to the target device and to elements except for an activation interruption receiving element included in the control device; and
   in the first power saving mode,
   the processor temporarily supplies power to the control device at a predetermined timing,
   the processor obtains, when the processor detects the change in the mounting state of the cable, the type information representing the type of the cable, and
   the processor changes the setting of the cable in accordance with the type information obtained by the processor.

6. The control device according to claim 5, wherein when the processor detects no change in the mounting state of the cable or when the processor completes changing of the setting, the processor finishes temporal supplying of power to the control device.

7. The control device according to claim 1, wherein
   the power saving mode is a second power saving mode that stops power supply to the target device and to elements except for an element for detecting the change in the mounting state of the cable and an activation interruption receiving element included in the control device; and
   in the second power saving mode,
   the processor temporarily supplies, when the processor detects reception of the mounting interruption of the cable as the change in the mounting state of the cable, power to the control device,
   the processor obtains the type information representing the type of the cable, and the processor that changes the setting of the cable in accordance with the type information obtained by the processor.

8. The control device according to claim 7, wherein when the processor completes changing of the setting, the processor finishes temporal supplying of power to the control device.

9. A non-transitory computer-readable recording medium having a stored therein a control program that causes a computer comprising a processor that controls a target device to execute a process comprising:
monitoring a link state of an upper connection port connected to another upper device via a cable;
determining that the upper connection port comes into an unused state when detecting a continuation of a link-down state of the upper connection port as the link state;
shifting, when the upper connection port is determined to come into the unused state, a power supply state to the target device and to a control device from a normal power supply mode into a power saving mode capable of receiving activation interruption from the another upper device;
detecting a cable type change of the cable upon receipt of mounting interruption supplying power to the control device temporarily in the power-saving mode;
obtaining, when detecting the cable type change, type information representing a type of the cable; and
changing setting of the cable in accordance with the type information obtained in the obtaining.

10. The non-transitory computer-readable recording medium according to claim 9, wherein the process further comprises:
when the activation interruption is received in the power-saving mode, shifting the power supply state from the power saving mode to the normal power supply mode.

11. The non-transitory computer-readable recording medium according to claim 9, wherein the process further comprising:
when the setting of the cable before the changing is the same as setting after the changing, omitting the changing of the setting of the cable.

12. The non-transitory computer-readable recording medium according to claim 9, wherein the process further comprises:
obtaining the type information by reading the type information from a register attached to the cable.

13. The non-transitory computer-readable recording medium according to claim 9, wherein:
the power saving mode is a first power saving mode that stops power supply to the target device and to elements except for an activation interruption receiving element included in the control device; and
the process further comprises:
in the first power saving mode,
temporarily supplying power to the control device at a predetermined timing,
obtaining, when detecting the change in the mounting state of the cable, the type information representing the type of the cable, and
changing the setting of the cable in accordance with the type information obtained in the obtaining.

14. The non-transitory computer-readable recording medium according to claim 13, wherein the process further comprises when detecting no change in the mounting state of the cable or when completing the changing of the setting, finishing the temporarily supplying of power to the control device.

15. The non-transitory computer-readable recording medium according to claim 9, wherein:
the power saving mode is a second power saving mode that stops power supply to the target device and to elements except for an element for detecting the change in the mounting state of the cable and an activation interruption receiving element included in the control device; and
the process further comprises:
in the second power saving mode,
temporarily supplying, when detecting reception of the mounting interruption of the cable as the change in the mounting state of the cable, power to the control device,
obtaining the type information representing the type of the cable, and
changing the setting of the cable in accordance with the type information obtained in the obtaining.

16. The non-transitory computer-readable recording medium according to claim 15, wherein when completing the changing of the setting, finishing the temporarily supplying of power to the control device.

17. The control device according to claim 1, wherein
the power saving mode is a first power saving mode that stops power supply to the target device and to elements except for an activation interruption receiving element included in the control device; and
when an SAS packet served as activation interruption is received in the first power saving mode, the processor shifts the power supply state from the first power saving mode to the normal power supply mode.

18. The non-transitory computer-readable recording medium according to claim 9, wherein
the power saving mode is a first power saving mode that stops power supply to the target device and to elements except for an activation interruption receiving element included in the control device; and
when an SAS packet served as activation interruption is received in the first power saving mode, the processor shifts the power supply state from the first power saving mode to the normal power supply mode.

* * * * *